(12) United States Patent
Smith

(10) Patent No.: US 6,494,427 B1
(45) Date of Patent: Dec. 17, 2002

(54) TRIMMER LINE CARRIER

(76) Inventor: Larry B. Smith, 9301 Hwy. 270, Pine Bluff, AR (US) 71602

( * ) Notice: Subject to any disclaimer, the term of this patent is extended or adjusted under 35 U.S.C. 154(b) by 0 days.

(21) Appl. No.: 09/858,054

(22) Filed: May 15, 2001

(51) Int. Cl.[7] .................................................. E04G 5/06
(52) U.S. Cl. ................................... 248/231.81; 224/401
(58) Field of Search .......................... 248/224.4, 230.7, 248/231.81, 314, 682, 689, 311.2, 51, 52; 224/401, 409; 220/475; 30/296.1, 278

(56) References Cited

U.S. PATENT DOCUMENTS

| | | | | |
|---|---|---|---|---|
| 3,578,199 A | * | 5/1971 | Duncan ........................ 220/31 |
| 3,717,282 A | | 2/1973 | Nordskog |
| 3,803,664 A | * | 4/1974 | Triplett ..................... 15/250.03 |
| 4,042,156 A | | 8/1977 | Knight |
| 4,193,525 A | * | 3/1980 | Sommers ..................... 224/35 |
| 4,444,324 A | | 4/1984 | Grenell |
| 4,516,409 A | | 5/1985 | Hobbs, Jr. et al. |
| 4,574,981 A | | 3/1986 | Jewett |
| 4,809,890 A | | 3/1989 | Tsigadas |
| 5,188,327 A | * | 2/1993 | White ...................... 248/231.8 |
| D394,208 S | | 5/1998 | Rutledge |
| 5,765,712 A | | 6/1998 | Skinner et al. |
| 5,816,396 A | * | 10/1998 | Shin ........................ 206/315.3 |
| 5,823,046 A | * | 10/1998 | Shangerstrom et al. ....... 73/427 |
| 5,836,103 A | * | 11/1998 | Taylor ........................... 43/26 |

* cited by examiner

Primary Examiner—Anita King
Assistant Examiner—Kofi Schulterbrandt
(74) Attorney, Agent, or Firm—Dale J Rearn

(57) ABSTRACT

A trimmer line carrier for use with a string trimming mower includes a tubular container having an open end for carrying individual strands of replacement trimming line. A removable cap is coupled to the container for selectably covering the open end. The container includes clamps capable of releasably attaching the container to a handle bar of a string trimming mower. A plurality of guide flanges defining respective apertures are positioned longitudinally along the container outer wall to receive a selected strand therethrough. Linear scale indicia and corresponding graduated numerical indicia are imprinted on the container adjacent the guide flanges such that a strand received through the flanges may be measured using the indicia. A cutter is positioned at one end of the container for cutting a strand of trimming line to a desired measured length.

19 Claims, 4 Drawing Sheets

TRIMMER LINE CARRIER

BACKGROUND OF THE INVENTION

This invention relates generally to storage containers and, more particularly, to a container which holds individual strands of replacement trimmer line for attachment to and use with a push-type string trimming mower.

String trimmer mowers that may be pushed like a push lawnmower enable grass or weeds growing very close to trees or other objects to be cut easily. In addition, these push-type string trimmer mowers are easier to use than their hand-held counterparts in that no bending or lifting of the unit is required. However, individual strands of the trimming string often become entangled about the spinning trimming head of the mower, become entangled with other object, or are simply hurled outwardly from the mower. In any case, obtaining a proper replacement trimming line is a frequent and inconvenient occurrence. Various devices have been proposed in the art for storing or carrying articles such as beverages or tennis balls. Although assumably effective for their intended purposes, the existing devices do not provide a carrier conveniently attachable to a push-type string trimming mower for carrying a supply of replacement trimming line.

Therefore, it is desirable to have a trimmer line carrier which may be coupled to a push-type string trimmer mower and holds a supply of individual strands of replacement trimming line. Further, it is desirable to have a trimmer line carrier which enables each strand to be measured and cut to a desired length before connecting it to the mower.

SUMMARY OF THE INVENTION

A trimmer line carrier according to the present invention includes a tubular container having a closed end and an open end for holding a plurality of individual strands of replacement trimmer line, individual strands being inserted or removed through the open end. The container includes a removable end cap for selectably covering the open end. At least one clamp is mounted to the outer surface of the container for removably coupling the container to a handle bar of a push-type trimming mower. A plurality of guide flanges are mounted to the container's outer surface and are spaced apart between the open and closed ends. Each flange defines an aperture and the flanges are aligned such that a strand of trimming line selected from the plurality of strands housed in the container may be extended linearly therethrough.

A set of linear scale indicia is imprinted on the outer surface of the container substantially adjacent the guide flanges. A set of graduated numerical indicia is also imprinted thereon and corresponds to the linear scale indicia. A cutter having a pair of blades is mounted to the outer surface of the container substantially adjacent the open end and in longitudinal alignment with the guide flanges. Therefore, the selected strand of trimming line may be inserted through the guide flange apertures, measured according to the linear scale and graduated numerical indicia and then cut to the desired length. This enables a user to connect precisely the right length of trimmer line to the spinning head of the trimmer mower. This is important in that string trimmer mowers of various sizes require the use of respectively different lengths of trimmer line. A box for storing tools is also attached to the container.

Therefore, a general object of this invention is to provide a trimmer line carrier having a tubular container that can store a supply of individual strands of replacement trimmer line.

Another object of this invention is to provide a trimmer line carrier, as aforesaid, having a box attached to the container for storing tools.

Still another object of this invention is to provide a trimmer line carrier, as aforesaid, having a plurality of guide flanges and a cutter for severing a strand of trimmer line.

Yet another object of this invention is to provide a trimmer line carrier, as aforesaid, having linear scale indicia and corresponding graduated numerical indicia for measuring a desired length of trimmer line to be severed.

A further object of this invention is to provide a trimmer line carrier, as aforesaid, in which the open end of the container and the tool box include a cap and a door, respectively, that are easy to open.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
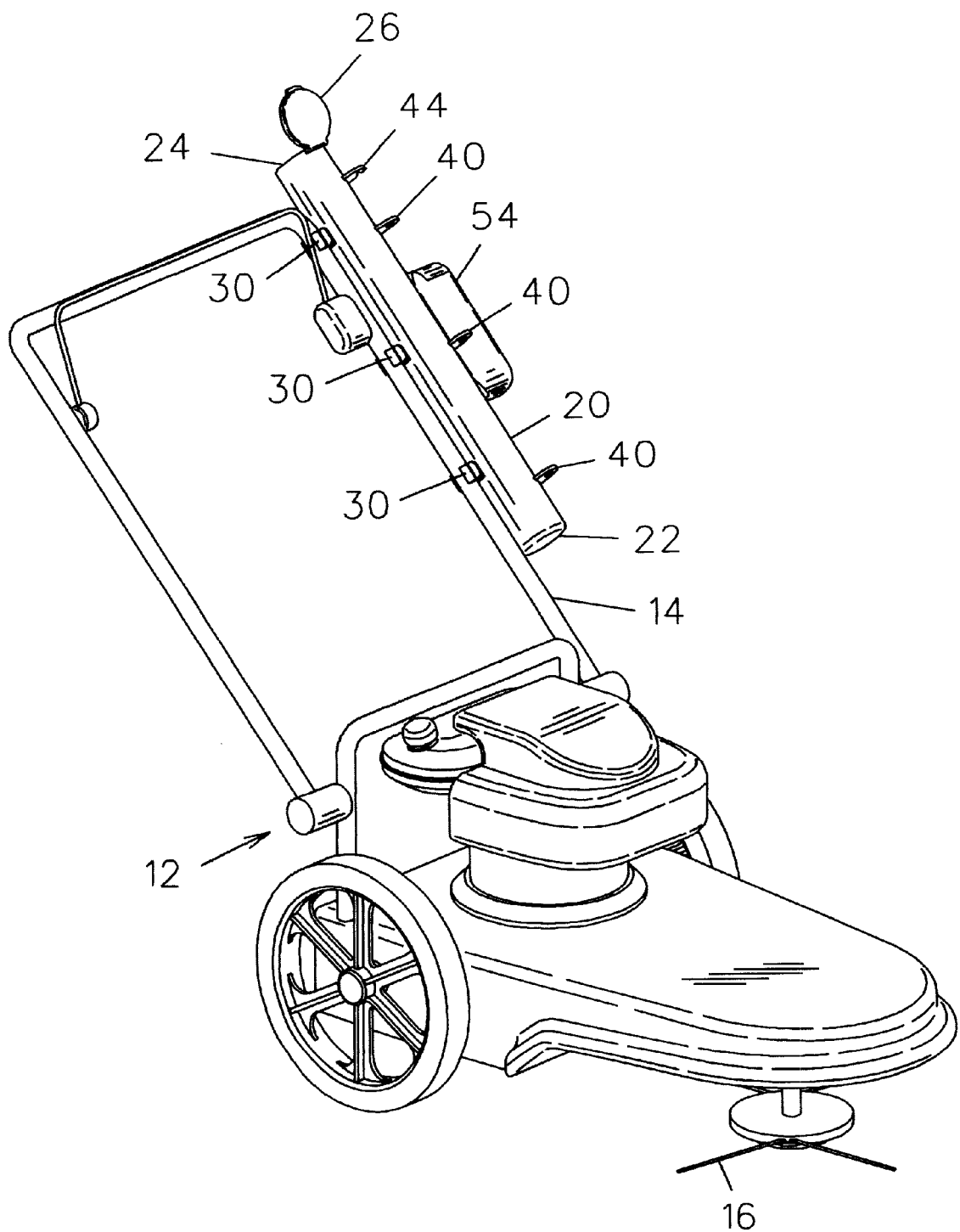
FIG. 1 is a perspective view of a trimmer line carrier according to the preferred embodiment of the present invention in use on a string trimmer mower.

A trimmer line carrier 10 according to a preferred embodiment of the present invention will now be described with reference to FIGS. 1 through 4 of the accompanying drawings. The trimmer line carrier 10 includes an elongate tubular container 20 having an outer surface and defining an inner space capable of storing a plurality of individual strands of replacement trimming line 16. Preferably, trimming line 16 constructed of a plastic material used with a push-type string trimming mower 12 (FIG. 1) is stored in the container 20. The tubular container 20 includes a first closed end 22 and defines an opposed second open end 24 (FIG. 2), whereby strands of trimmer line 16 may be inserted into the container 20 through the open end 24. A removable end cap 26 is releasably coupled to an end of the container adjacent the open end 24 so that the end cap 26 may selectably cover the open end 24. Preferably, the end cap 26 is pivotally attached to the container 20 with a hinge 28 (FIG. 4) although attachment with a tether or the like would also work. Obviously, a removable end cap that is not attached to the container 20 at all would also serve the objectives of this invention. It is understood that a plug (not shown) may be inserted into the container 20 such that strands of shorter lengths are easily accessible to a user for use with certain models of string trimmer mowers.

Figure 2:
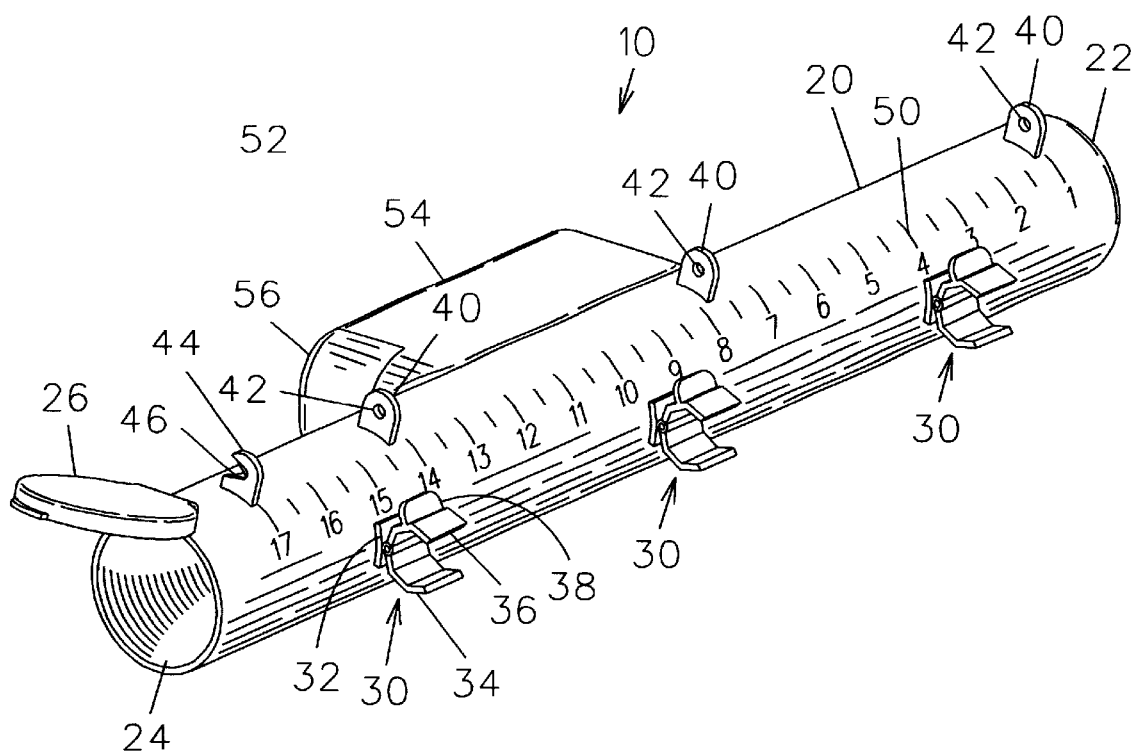
FIG. 2 is a another perspective view of the carrier as in FIG. 1 on an enlarged scale with the string trimmer mower removed.

A plurality of clamps 30 are mounted to the outer surface of the container 20 (FIG. 2) for selectively coupling the container 20 to a handle bar 14 of a string trimming mower 12 (FIG. 1). The clamps 30 are spaced apart in longitudinal alignment along a longitudinal extent of the container 20. Each clamp 30 includes a base 32 fixedly attached to the outer surface of the container 20 with first 34 and second 36 generally arcuate legs coupled to the base 32 to form a generally U-shaped configuration with an open end. The first leg 34 is fixedly attached to the base 32 and the second leg 36 is coupled to the base with a spring that biases the second leg 36 toward the first leg 34. Therefore, the second leg 36 may be urged outwardly as the clamp 30 is pressed onto a bar and then is biased to secure the clamp 30 thereto. Each clamp 30 includes a tab 38 attached to a respective second leg 36 and extending outwardly therefrom (FIG. 2). A user depression of a tab 38 urges a corresponding second leg 36 away from a corresponding first leg 34. In other words, depression of a tab 38 causes a corresponding clamp 30 to open wider. Although spring-loaded clamps have been described herein, it is understood that many other types of clamps would also be suitable.

Further, a plurality of guide flanges 40 are fixedly mounted to the outer surface of the container 20 and are spaced apart along the longitudinal extent thereof. Each guide flange 40 defines an aperture 42. The guide flanges 40 are positioned such that the apertures 42 define an imaginary longitudinal axis extending therethrough. A cutter 44 having dimensions substantially similar to that of the guide flanges 40 is mounted to the outer surface of the container 20 substantially adjacent the second open end 24 and in longitudinal alignment with the guide flanges 40 (FIG. 2). The cutter 44 includes a pair of blades 46 having a V-shaped configuration. Therefore, a strand of trimmer line may be selected from the plurality of strands stored in the container, extended through the apertures 42 of the guide flanges 40, and cut to a desired length by the cutter blades 46.

A set of linear scale indicia 50 is imprinted upon the outer surface of the container 20 along the longitudinal extent thereof between first and second ends (FIG. 2). A set of graduated numerical indicia 52 is also imprinted thereon corresponding to the set of linear scale indicia 50. Preferably, the sets of indicia are imprinted between the guide flange 40 and the clamps 30 and with the graduated numerical indicia incrementally increasing in one inch increments between the first 22 and second 24 ends. The linear scale indicia are preferably imprinted in half-inch increments although smaller increments would also work. Therefore, a strand of trimmer line extended through the guide flange apertures 42 may be measured using the sets of linear scale and graduated numerical indicia so that the strand may be cut to the precise length needed for use with a particular string trimming mower.

Figure 3:
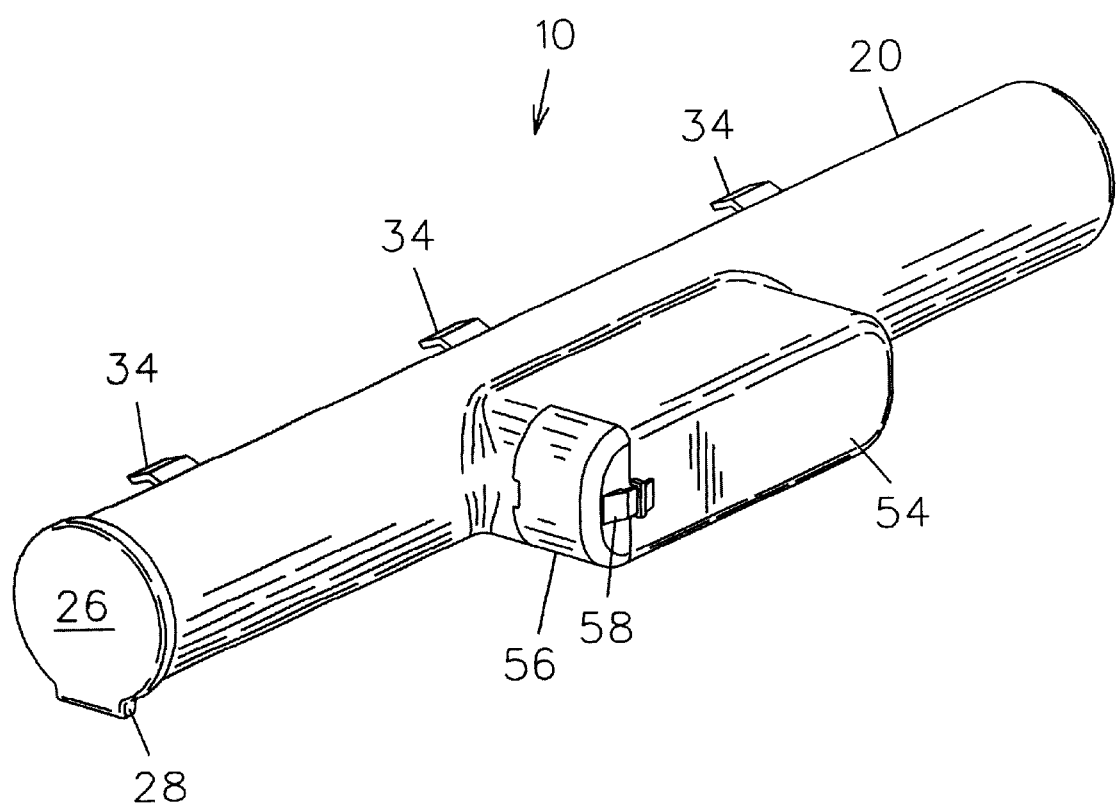
FIG. 3 is a reverse perspective view of the carrier as in FIG. 2 with the end cap and tool box doors in closed configurations.
Figure 4:
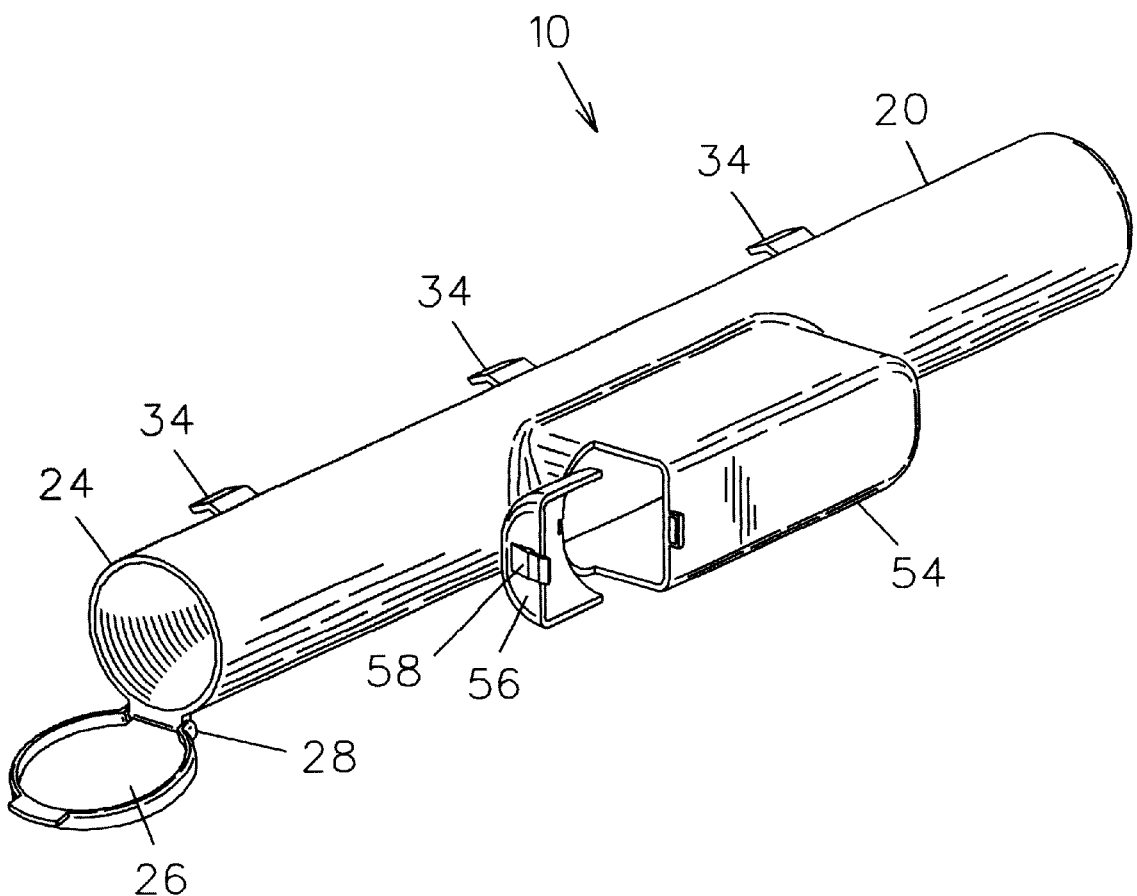
FIG. 4 is a perspective view of the carrier as in FIG. 3 with the end cap and tool box doors in open configurations.

A housing 54 is fixedly attached to the outer surface of the container 20 and may be integrally constructed therewith (FIG. 3). The housing includes a box-shaped configuration having a pair of side walls with a pair of opposed end walls extending therebetween. A top wall extends between edges of the side walls and connects the end walls. A door 56 is pivotally coupled to the end wall nearest the second open end 24 of the container (FIG. 4). The door 56 may be opened for access to the housing 54 or closed and secured with a latch 58. The housing 54 functions as a tool box in which tools likely to be used with a string trimmer mower may be stored, such as pliers, cutters, knife, screwdriver, or the like.

In use, a plurality of strands of replacement trimmer line are inserted into the container 20 through the second open end 24 and the end cap 26 is closed to cover the opening. If the container 20 is not already coupled to a string trimmer mower 12, at least one clamp 30 thereof may be pressed to engage a handle bar 14 of the trimmer. Pressure may be exerted by a user upon the clamp tabs 38 to assist in opening the clamps 30 sufficiently to engage the handle bar 14. When a strand of trimmer line 16 connected to the spinning head of the trimmer mower 12 needs to be replaced, a new strand may be selected from the plurality of strands stored in the container 20. The selected strand may be inserted through the guide flange apertures 42 and compared to the linear scale indicia 50 and graduated numerical indicia 52 to determine if the strand is the correct length for use with the string trimmer mower 12. If not, the selected strand may be severed by the blades 46 of the cutter 44 and the portion thereof having a correct length may be connected to the mower. Of course, the selected strand may be cut manually using cutters which may be stored in the tool housing 54. Other tools stored in the tool housing 54 may be used as needed, such as to cut a tangled strand of trimmer line, etc.

It is understood that while certain forms of this invention have been illustrated and described, it is not limited thereto except insofar as such limitations are included in the following claims and allowable functional equivalents thereof.

having thus described the invention, what is claimed as new and desired to be secured by letters patent is as follows:

1. A trimmer line carrier for use with a string trimmer mower, comprising:

a tubular container having a first closed end and defining a second open end, said container defining an interior space for holding a plurality of strands of trimmer line;

a removable end cap for selectably covering said second open end;

at least one clamp fixedly attached to said container and adapted to releasably couple said container to a handle bar of a string trimmer mower;

a plurality of guide flanges fixedly attached to said container, each guide flange defining an aperture, said plurality of guide flanges being positioned such that said apertures define an imaginary longitudinal axis therethrough for selectably receiving a strand of trimmer line; and a cutter attached to said carrier along said imaginary longitudinal axis for selectively cutting said strand of trimmer line received through said apertures of said guide flanges.

2. The trimmer line carrier as in claim 1 wherein said end cap is pivotally coupled to said container adjacent said second open end, said end cap being selectably movable between open and closed configurations.

3. The trimmer line carrier as in claim 1 wherein said container includes:

a set of linear scale indicia imprinted along a longitudinal extent thereof;

a set of graduated numerical indicia imprinted along said longitudinal extent corresponding to said set of linear scale indicia;

whereby said strand of trimmer line received trough said guide flange apertures may be measured and cut to a desired length.

4. The trimmer line carrier as in claim 1 wherein said container includes:

a set of linear scale indicia imprinted along a longitudinal extent thereof;

a set of graduated numerical indicia imprinted along said longitudinal extent corresponding to said set of linear scale indicia;

whereby a strand of trimmer line selected from said plurality of strands of trimmer line may be measured using said sets of linear scale and graduated numerical indicia prior to installing said selected strand on a string trimmer mower.

5. The trimmer line carrier as in claim 1 wherein said at least one clamp includes a generally U-shaped configuration having a first leg and a second leg biased toward said first leg, said second leg being movable away from said first leg when said clamp is pressed into engagement with a bar.

6. The trimmer line carrier as in claim 5 wherein said at least one clamp includes a tab attached to said second leg and adapted to urge said second leg away from said first leg upon user depression of said tab.

7. The trimmer line carrier as in claim 1 further comprising a housing attached to said container having a box-shaped configuration, said housing having a door releasably coupled to an end wall thereof.

8. The trimmer line carrier as in claim 7 wherein said housing door is releasably coupled to said housing with a latch.

9. A trimmer line carrier for use with a string trimmer mower, comprising:

an elongate tubular container having a first closed end and defining a second open end, said container defining an interior space for holding a plurality of separate strands of trimmer line;

a plurality of guide flanges fixedly attached to said container, each guide flange defining an aperture, said plurality of guide flanges being positioned such that said apertures define an imaginary longitudinal axis therethrough and parallel to said container for selectably receiving a strand of trimmer line therethrough; and a cutter attached to said carrier and positioned along said imaginary longitudinal axis for selectively cutting said strand of trimmer line selectably received through said apertures of said guide flanges.

10. The trimmer line carrier as in claim 9 wherein each guide flange is normal to said container and extends outwardly therefrom such that each aperture is displaced from said container.

11. The trimmer line carrier as in claim 9 further comprising an end cap releasably coupled to said container and adapted to selectably cover said second open end.

12. The trimmer line carrier as in claim 9 wherein said container includes:

a set of linear scale indicia imprinted along a longitudinal extent thereof;

a set of graduated numerical indicia imprinted along said longitudinal extent and corresponding to said set of linear scale indicia; and whereby a strand of trimmer line selected from said plurality of strands of trimmer line may be measured using said sets of linear scale and graduated numerical indicia and cut to a desired length on said cutter prior to installing said selected strand on a string trimmer mower.

13. The trimmer line carrier as in claim 9 further comprising at least one clamp fixedly attached to said container and adapted to releasably couple said container to a handle bar of a string trimmer mower.

14. The trimmer line carrier as in claim 13 wherein said at least one clamp comprises:

a generally U-shaped configuration having a first leg and a second leg biased toward said first leg, said second leg being movable away from said first leg upon engagement of said at least one clamp with a bar; and a tab attached to said second leg and adapted to urge said second leg away from said first leg upon user depression of said tab.

15. The trimmer line carrier as in claim 9 further comprising a housing attached to said container having a box-shaped configuration, said housing having a door releasably coupled to a side thereof facing said second open end of said container.

16. A trimmer line carrier for use with a string trimmer mower, comprising:

an elongate tubular container having a first closed end and defining a second open end, said container defining an interior space for holding a plurality of elongate strands of trimmer line;

a set of linear scale indicia imprinted along a longitudinal extent of said container;

a set of graduated numerical indicia imprinted along said longitudinal extent of said container corresponding to said set of linear scale indicia;

a cutter attached to said container adjacent said second end thereof having a pair of blades adapted to selectably sever a strand of trimmer line;

whereby a strand of trimmer line selected from said plurality of strands of trimmer line may be measured using said sets of linear scale and graduated numerical indicia and cut to a desired length prior to installing said selected strand on a string trimmer mower.

17. The trimmer line carrier as in claim 16 further comprising a plurality of guide flanges fixedly attached to said container, each guide flange defining an aperture, said plurality of guide flanges being positioned such that said apertures define an imaginary longitudinal axis therethrough and parallel to said container for selectably receiving a strand of trimmer line therethrough.

18. The trimmer line carrier as in claim 16 further comprising at least one clamp fixedly attached to said container and adapted to releasably couple said container to a handle bar of a string trimmer mower.

19. A trimmer line carrier as in claim 16 further comprising a housing attached to said container and having a box-shaped configuration, said housing having a door pivotally coupled to a side of said housing for access thereto.

* * * * *